Feb. 27, 1962            J. J. DUFFY            3,022,676

AUTOMATIC TRANSMISSION CONTROLS

Original Filed Sept. 12, 1958            2 Sheets-Sheet 1

JAMES J. DUFFY
INVENTOR.

BY Edwin C. McRae
John R. Faulkner
Donald J. Harrington

ATTORNEYS

United States Patent Office 3,022,676
Patented Feb. 27, 1962

3,022,676
AUTOMATIC TRANSMISSION CONTROLS
James J. Duffy, Scottsdale, Ariz., assignor to Ford Motor Company, Dearborn, Mich., a corporation of Delaware
Continuation of application Ser. No. 760,681, Sept. 12, 1958. This application Aug. 15, 1960, Ser. No. 49,796
17 Claims. (Cl. 74—472)

My invention relates generally to multiple speed power transmission mechanisms and more particularly to improved automatic controls for an automotive type multiple speed power transmission mechanism.

I contemplate that the improvement of my instant invention may be used in control systems for a variety of transmission mechanisms, but for purposes of the present description I have disclosed a transmission mechanism comprising a hydrokinetic torque transmitting unit and a planetary gear unit, the latter forming a plurality of torque delivery paths extending from the torque output member of the hydrokinetic unit to a driven member such as a transmission tailshaft. The torque output member of the hydrokinetic unit will hereinafter be referred to as the turbine member and it cooperates with an engine driven pump member in toroidal fluid flow relationship therewith.

This application forms a continuation of my pending application Serial No. 760,681, now abandoned, filed September 12, 1958.

Clutch and brake means are provided for controlling the relative motion of the elements of the gear unit and for providing a driving torque reaction whereby any of several torque delivery paths may be established with varying torque multiplication ratios. A high speed ratio is utilized during normal cruising operation and a relatively low speed ratio may be utilized during acceleration. The automatic control system of which the improvement of my instant invention forms a part is capable of conditioning the transmission for operation in the various ratios in accordance with the operating conditions, and the control system is in turn responsive to control signals that are proportional in magnitude to vehicle speed and engine torque demand. A speed governor mechanism is used to establish the vehicle speed signal to provide the control system with an indication of vehicle speed and a throttle valve mechanism is used to provide a variable throttle pressure proportional in magnitude to engine throttle setting, and this throttle pressure is utilized in the control system as an indication of engine torque demand.

In the embodiment herein disclosed, a clutch mechanism is employed for establishing a gear ratio of unity in the gear unit and a brake mechanism is provided for anchoring one of the elements of the gear unit to condition the mechanism for operation in a relatively low speed ratio. Pressure operated servos are employed for sequentially operating the clutch mechanism and the brake mechanism, and the brake servo is preferably of a double-acting type with a working fluid pressure chamber disposed on opposed sides of a brake operating piston. An engine driven pump or a tailshaft driven pump may be provided for supplying the servos with control pressure. When both pressure chambers of the brake servo are pressurized, the brake mechanism assumes a released condition, but when the pressure in the chamber on the release side of the servo of the brake mechanism is exhausted, the brake mechanism assumes an energized condition. In order to effect the above-mentioned sequential operation of the clutch and brake mechanisms, the clutch servo is disposed in fluid communication with the pressure chamber on the release side of the brake servo so that the brake mechanism will automatically become released when the clutch mechanism is applied and conversely, the clutch will automatically become released when the brake mechanism is applied.

The control system is designed to effect a so-called downshift when the vehicle engine throttle is relaxed while the transmission mechanism is conditioned for direct drive operation whereby the clutch mechanism becomes released and the brake mechanism becomes applied. This downshift occurs at low vehicle speed under coasting conditions and the transmission is thereby conditioned for subsequent maximum acceleration when the vehicle operator again opens the engine throttle.

It is desirable to delay and to cushion the application of the brake mechanism during such a zero throttle downshift in order to prevent an undesirable sharp deceleration of the vehicle due to inertia forces. This cushioning action is accomplished in my improved control system by introducing a fluid flow restriction in the fluid flow passage extending from the release side of the brake servo under closed throttle, coasting conditions. The fluid in this passage is directed through the flow restricting orifice by means of a movable orifice control valve which is operated in response to variations in the abovementioned throttle pressure so that it assumes a flow restricting position whenever the engine throttle is adjusted to a closed position during operation in the high speed ratio.

I contemplate that the same fluid pressure passage used for exhausting the release side of the brake servo will also be used to distribute fluid pressure to the brake servo during an upshift from the low speed ratio to the high speed ratio. Such an upshift can occur under zero throttle conditions, and it is desirable during such an upshift for the brake to become released rapidly in order to prevent an undesirable overlap in the operation of the clutch and brake mechanisms. I have therefore made provision for such a rapid release of the brake mechanism to take place by providing a bypass path for the brake servo fluid around the above-mentioned flow restricting orifice.

The orifice control valve and the exhaust flow restricting orifice will therefore operate only during a zero throttle downshift and they are ineffective to delay operation of the brake servo during a zero throttle upshift. Also, the orifice control valve and its associated orifice are ineffective to delay the application of the low speed brake band during a so-called forced downshift from the high speed gear ratio to the low speed gear ratio with an advanced throttle setting.

The control system further includes a means for manually selecting the low speed ratio so that the transmission mechanism will operate continuously with an increased torque multiplication ratio and be prevented from upshifting into a high speed ratio. Such a manual shift may also be used for the purpose of obtaining a higher degree of engine braking than that which may be obtained with the transmission conditioned for operation in a higher speed ratio.

If such a manual shift occurs while the vehicle is operating at a relatively high speed under cruising conditions, and if the engine throttle is closed for the purpose of obtaining engine braking, it is desirable to obtain a rapid application of the low speed brake band as the clutch becomes disengaged. This prevents an undesirable slippage of the friction elements of the transmission due to an overlap in the operation of the clutch and the brake. I have therefore made provision for urging the movable valve element of the orifice control valve to an inoperative position when such a manual shift to the low speed range is made. This is accomplished by means of a pressure operated element which is movable under the influence of control pressure so that it urges the orifice control valve element to an inoperative position. The manual valve which is effective to condition the system for low speed ratio operation is also effective to distribute control pressure to this pressure operated element whenever continued operation in the low speed ratio is desired.

The provision of an improved control system of the type above set forth being a principal object of my invention, it is another object of my invention to provide a control system capable of controlling the timing of the various fluid pressure operated servos of an automatic multiple speed mechanism so that a shift from one ratio to another may take place with a maximum degree of smoothness under all driving conditions.

It is a further object of my invention to provide an automatic power transmission of the automotive type for delivering torque of the vehicle engine to the vehicle traction wheels wherein provision is made for controlling the application of a fluid pressure operated brake servo during the sequential operation of the brake servo in timed relationship with a fluid pressure operated clutch servo when the transmission mechanism is downshifted from a high speed ratio to a low speed ratio under coasting conditions.

It is a further object of my invention to provide a control mechanism of the type above described wherein proper timing during an upshift from the low speed ratio to a higher speed ratio can be maintained so that a cushioned operation of the brake servo is not experienced during an upshift under zero throttle conditions.

It is a further object of my invention to provide a control mechanism of the type above set forth wherein the delayed action of the brake servo is not experienced during a manual downshift into the low speed ratio.

It is a further object of my invention to provide a control system of the type above set forth which is simple in construction and which can be readily applied to a variety of control system for various transmission mechanisms of known construction.

For the purpose of more particularly describing the principal features of my invention, reference will be made to the accompanying drawings wherein:

FIGURE 1 is a cross sectional assembly view of an automatic power mechanism capable of being used in the power train of an automotive vehicle;

Figures 1, 3:
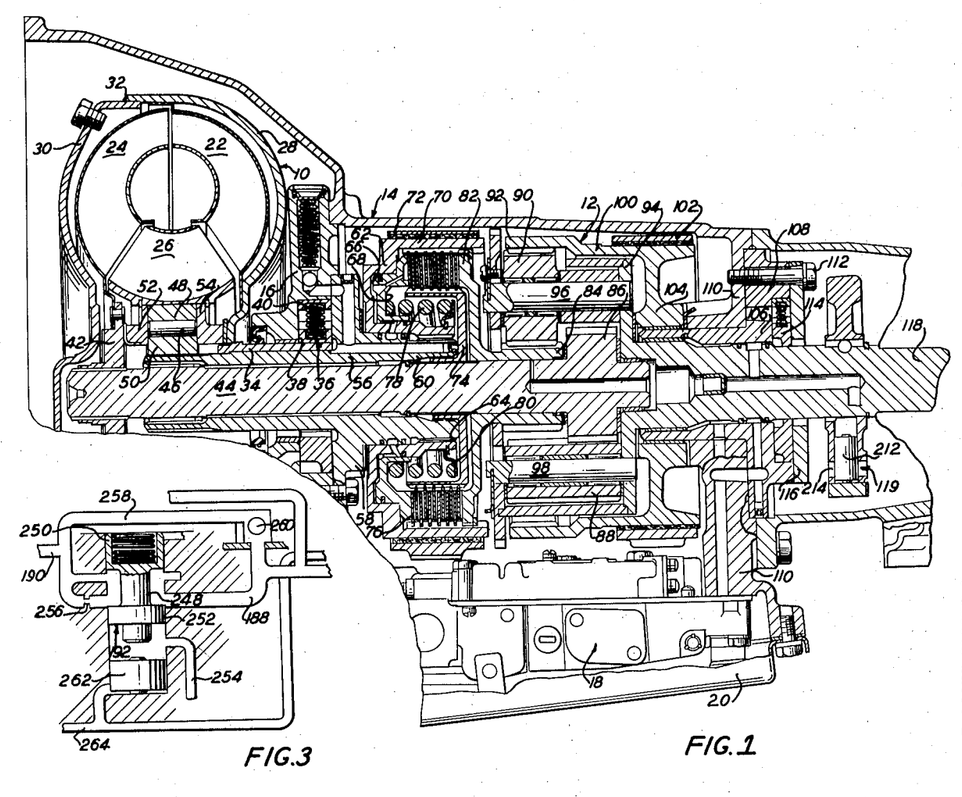

Referring first to FIGURE 1, the transmission mechanism comprises a hydrokinetic torque converter generally designated by numeral 10 and a compound planetary gear unit generally designated by numeral 12. The converter 10 and the gear unit 12 are situated in spaced portions of a common transmission casing 14, said spaced portions being separated by a wall 16. The automatic control mechanism for the transmission is generally designated by the numeral 18 and it is situated in a lower region of the transmission assembly which defines a sump 20 containing a supply of fluid for the control mechanism 18.

The torque converter 10 comprises a pump member 22, a turbine member 24 and a reactor member 26, said converter members each comprising a plurality of fluid flow directing blades disposed in angularly spaced relationship about the geometric axis thereof. The blades for the respective converter members are joined by inner and outer shrouds which define a toroidal fluid flow path for accommodating a circulation of the work performing fluid. The pump member 22 includes a pump shell 28 secured to a drive plate 30 by means of a continuous peripheral weld 32. The drive plate 30 in turn may be connected to the crankshaft of the vehicle engine, not shown.

The inner periphery of pump shell 28 is secured to a supporting shaft 34 which extends axially into a cooperating opening formed in wall 16 of the transmission casing. A positive displacement pump is positioned within a suitable pump recess formed in wall 16 as indicated at 36. The pump illustrated in FIGURE 1 is of the slipper type although other forms of positive displacement pumps may be used, such as a gear pump having cooperating internal and external gears. The pump 36 includes a rotor 38 having peripheral slots within which slippers 40 are situated, said slippers forming the working elements of the pump mechanism as the rotor 38 is driven by the shaft 34. It is thus apparent that the pump 36 will be continuously driven by the vehicle engine in a direct and positive fashion during operation of the transmission mechanism.

The outer shroud for the turbine member 24 is positively connected to a hub member 42 which in turn is splined to an intermediate power delivery shaft 44.

The radially inward shroud for reactor member 26 is formed with a central opening within which is positioned an overrunning brake 46 having inner and outer races 48 and 50, respectively. Thrust elements 52 and 54 are disposed on either side of the overrunning brake 46 as indicated. The inner race 50 of the overrunning brake 46 is splined to a stationary reactor shaft 56 which is formed integrally with a stationary adaptor 58. Adaptor 58 in turn is secured to the wall 16 and forms a closure for the pump chamber of the pump 36. Wall 16 also includes an extension 60 which forms the bearing support for a clutch cylinder member 62, a suitable bushing 64 being provided for this purpose.

The member 62 defines an annular cylinder 66 within which is positioned a cooperating annular piston 68. The periphery of member 62 defines a brake drum 70 about which a brake band 72 is disposed.

A clutch member 74 is splined to shaft 44 and the periphery thereof is adapted to carry clutch discs as indicated, said clutch member 74 and the clutch discs being formed with cooperating internal splines in a conventional fashion. The interior portion of the brake drum 70 is internally splined and externally splined clutch discs cooperate therewith to partly define a multiple disc clutch assembly. The discs carried by clutch member 74 and the discs secured to drum 70 are situated in alternate relationship and the assembly defined thereby is identified by numeral 76.

The piston 68 is normally urged in a left-hand direction, as viewed in FIGURE 1, by a clutch return spring 78, said spring being seated on a spring seat element 80. The piston 68 and the cooperating cylinder define a working chamber and pressurized fluid may be admitted into this chamber through suitable internal passages to create a clutch energizing force.

A second clutch member 82 is positively connected to element 70 and it acts as a reaction element for the multiple disc clutch assembly 76.

The gear unit 12 comprises a pair of sun gears of differential diameter. The smaller of the sun gears is connected to clutch member 82 and is designated by numeral 84. The other sun gear, which is shown at 86, is formed on or joined to shaft 44 in adjacent relationship relative to sun gear 84. The gear unit 12 further includes compound planetary gears consisting of long planet pinions 88 and short planet pinions 90. The planet pinions 90 are drivably engaged with sun gear 84 and with a ring gear shown at 92 and the short planet pinions 88 engage sun gear 86. Planet pinions 88 and 90 are also in mesh with each other. Both the planet pinions 88 and 90 are carried by a common carrier assembly identified by numeral 94, the carrier assembly including pinion shafts 96 and 98 upon which pinions 92 and 90, respectively, are rotatably journaled.

The ring gear 92 forms a part of a brake member in the form of a drum 100 and a reaction brake band 102 is disposed about drum 100. As already indicated, suitable servos are provided for each of the brake bands 72 and 102 and these servos will subsequently be described.

The brake drum 100 includes a hub portion 104 journaled on an extension 106 which in turn forms a part of an adapter 108. The transmission casing 14 includes an end wall 110 and the adapter 108 may be secured thereto by suitable bolts 112.

The adaptor 108 is recessed to define a pump chamber for accommodating a pump mechanism 114 of the positive displacement type and a closure plate 116 is provided for enclosing the pump chamber. The pump mechanism 114 may be similar in form to the above-described pump 36, and the driving element thereof is positively keyed or otherwise secured to the transmission tailshaft, which is identified in FIGURE 1 by numeral 118. The tailshaft 118 in turn extends to the rear of the transmission mechanism and is journaled within the extension 106. The carrier assembly 94 of the planetary gear unit 18 is positively connected to tailshaft 118 to form a power output connection. A governor valve assembly 120 is positively connected to tailshaft 118 in order to provide a tailshaft speed signal for control purposes, said valve 120 forming a portion of the automatic control circuit subsequently to be described.

The transmission mechanism illustrated in FIGURE 1 is capable of providing two forward driving speed ratios and a reverse driving ratio. To condition the transmission mechanism for a low speed driving ratio of maximum torque multiplication, the brake band 72 may be energized thereby anchoring sun gear 84, the clutch disc 76 and brake band 102 being de-energized. The engine torque delivered to pump member 22 establishes a toroidal circulation in the converter and this results in an increased turbine torque which is transferred directly to sun gear 86 through the power delivery shaft 44. Sun gear 86 drives pinions 88 and the driving motion thereof is transferred to the transmission pinions 90. Since sun gear 84 is held stationary, the rotary motion of pinions 90 causes the carrier assembly 94 and the tailshaft 118 to rotate in a forward direction at a reduced speed ratio.

To obtain a second speed direct drive operation the brake band 72 is disengaged and the clutch disc assembly 76 is energized, the operation of the brake band 72 and the clutch disc assembly 76 being synchronized by the automatic control system in a fashion which will be subsequently described. After clutch disc assembly 76 is sufficiently energized, the sun gears 84 and 86 become locked together for joint movement. It is thus apparent that the elements of the planetary gear unit 12 will turn as a unit to establish a direct drive connection between turbine member 24 and tailshaft 118.

To obtain reverse drive, the brake band 72 and the clutch disc assembly 76 are both de-energized and the brake band 102 is energized. The ring gear 92 is therefore held stationary by brake band 102 and the turbine torque which is transferred to sun gear 86 tends to rotate pinions 88. The rotary motion of pinions 88 is transferred to pinions 90 and since the transmission sun gear 92 is held stationary, the pinions 90 tend to ride around ring gear 92 in a reverse direction, thereby providing a reverse driving torque to carrier assembly 94 and tailshaft 118.

Figure 2:
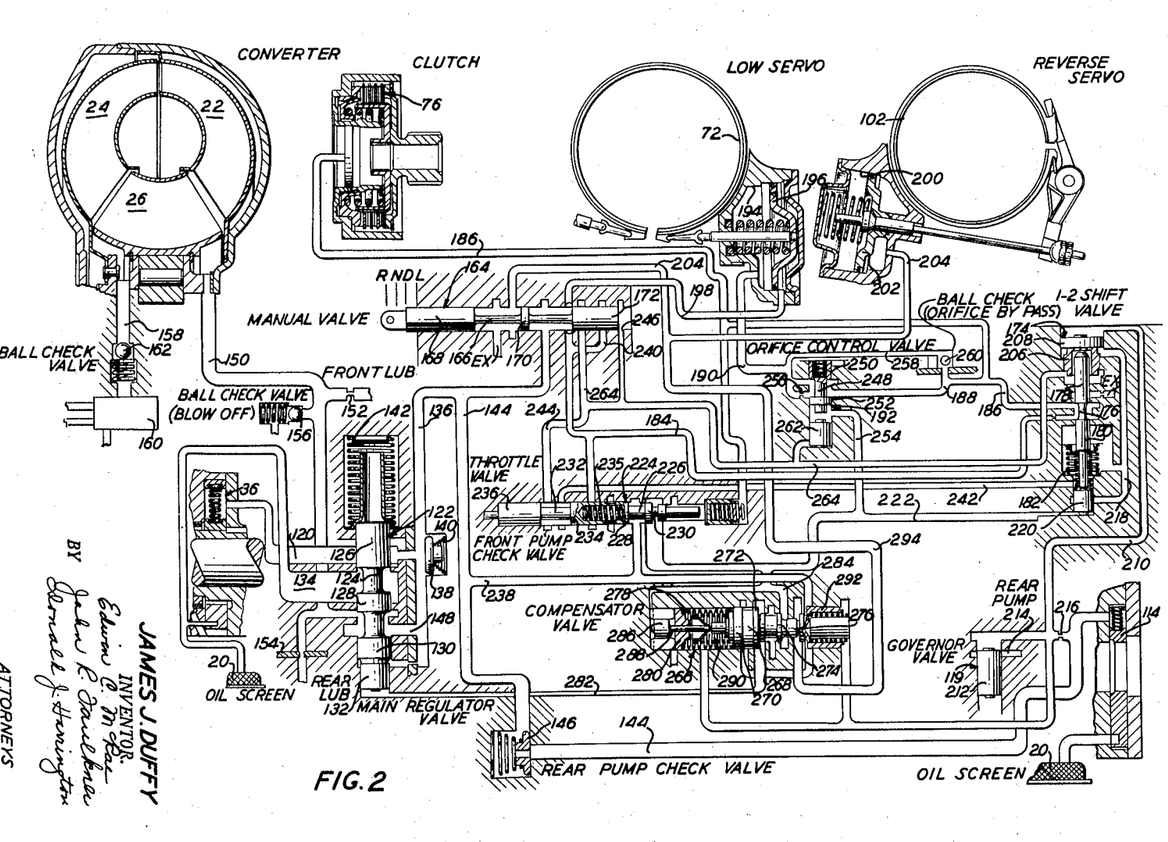
FIGURE 2 is a schematic diagram of an automatic control circuit capable of being used with the mechanism of FIGURE 1 for obtaining automatic speed changes; and, FIGURE 3 is an enlarged view of an orifice control valve which forms a part of the control circuit of FIGURE 2.

Referring next to FIGURE 2, the principal components of the automatic control circuit for the transmission mechanism of FIGURE 1 are identified by appropriate labels. The engine driven pump 36 is provided with a discharge passage 120 and the intake side of pump 36 communicates with the aforementioned sump 20. An oil screen may be provided around the oil intake passage for the pump 36 as indicated.

A main regulator valve is generally identified by numeral 122 and it comprises a multiple land valve spool 124 slidably situated within a cooperating valve opening, said valve spool 124 having spaced valve lands identified by numerals 126, 128, 130 and 132. The passage 120 communicates with the valve chamber of the regulator valve 122 and valve land 126 controls the degree of communication between passage 120 and an exhaust passage 134. Passage 120 also communicates with a control pressure passage 136 and a one-way check valve 138 is provided, as shown, for establishing direct fluid communication between passages 120 and 136. Check valve 138 is normally urged toward a closed position by a valve spring 140 as indicated.

The fluid pressure transferred to pressure passage 136 is redirected to the regulator valve chamber at a region between valve lands 128 and 130 and between valve lands 130 and 132. The diameter of valve land 132 is smaller than the adjacent valve land 130 and the control pressure in passage 136 is therefore effective to force the valve element 134 in an upward direction. This upwardly directed pressure force opposes and balances a downwardly directed spring force established by valve spring 142 which acts directly on the valve spool 124. It is thus apparent that the pressure established in passages 120 and 136 will be determined by the valve spring 142.

The discharge side of the tailshaft driven pump 114 communicates with control passage 136 through a passage 144. A one-way check valve generally designated by numeral 146 is situated in passage 144 and is adapted to accommodate the transfer of pressurized fluid from the pump 114 to passage 136 and to inhibit the transfer of pressurized fluid in the opposite direction. Valve 146 normally assumes a closed position under the influence of spring pressure.

Under those operating conditions in which the discharge pressure for the pump 36 is greater than the discharge pressure for pump mechanism 114, the one-way check valve 146 will be closed and one-way check valve 138 will be opened, and pressure regulation by the regulator valve 122 will be effected by valve land 126. However, under those driving conditions in which the discharge pressure for pump mechanism 114 is greater than the discharge pressure for pump 36, the check valve 138 will assume a closed position and check valve 146 will be opened. Communication is therefore established between passages 144 and 136, thereby permitting the pump mechanism 114 to supply the pressure requirements for the entire circuit. Under these conditions the control pressure in passage 136 is distributed to the regulator valve chamber in the region between valve lands 128 and 130, a suitable port 148 being provided for this purpose.

As soon as valve 138 closes, the valve spool 124 will be shifted in an upward direction so that valve land 128 will control the degree of communication between port 148 and the exhaust passage 134. Upon movement of the valve spool 124 to an upward position in this fashion, valve land 126 is shifted so that the discharge passage 120 is brought into direct communication with exhaust passage 134, thereby rendering the pump 136 inoperative. Since the pump 36 operates with a substantially zero pressure differential, a considerable saving in pumping horsepower is obtained.

It is contemplated that the pump mechanism 114 will be capable of supplying the total requirements of the circuit only at very high speeds during operation in the aforementioned direct drive ratio. However, the check valve 146 and the check valve 138 may both be opened during operation at an intermediate speed range so that the pump mechanism 114 will supplement the operation of the pump 36.

The hydrokinetic torque converter 10 is supplied with fluid by means of a converter supply passage 150 with the regulator valve chamber at a location adjacent valve land 128. Passage 150 is therefore brought into communication with passage 136 through port 138. Passage 150 also supplies the lubricating passages in the transmission mechanism as schematically shown at 152 and an orifice 154 is disposed between passage 150 and the exhaust region in order to maintain a desired back pressure in passage 150. The magnitude of the back pressure is controlled by a pressure relief valve 156.

A converter fluid return passage is shown at 158 and it communicates wth an oil cooler 160 through a check valve mechanism 162.

Passage 136 extends to a manual valve generally shown at 164, said manual valve including a valve spool 166 having spaced valve lands 168, 170 and 172, the passage 136 communicating with the manual valve at a region between valve lands 170 and 172.

The manual valve 164 may be adjusted to any of several operating positions to select the various drive ranges, said drive ranges being identified by the symbols R, N, D and L which respectively correspond to reverse, neutral, drive and low. When the valve spool 166 assumes the position shown in FIGURE 2, the transmission will be conditioned for operation in drive range.

A shift valve is generally identified in FIGURE 2 by numeral 174 and it comprises a valve element 176 having spaced valve lands 178 and 180. Valve element 176 is disposed in a cooperating valve chamber and is urged in an upward direction, as seen in FIGURE 2, by a valve spring 182. A passage 184 extends from the manual valve chamber to an intermediate region of the shift valve chamber and when the manual valve is in the position shown, passage 184 is in communication with passage 186 so that the former is subjected to control pressure.

When the valve element 176 assumes the position shown in FIGURE 2, communication is established between the passage 184 and passage 186, the latter extending to the fluid pressure operated servo for the multiple disc clutch assembly 76. Passage 184 also communicates with a passage 188 which in turn communicates with a passage 190 through an orifice control valve generally identified in FIGURE 2 by numeral 192. The passage 190 in turn communicates with one side of a fluid pressure operated servo for the brake band 72. This servo comprises a cylinder 194 and a cooperating piston 196, said piston and cylinder cooperating to define a pair of opposed working chambers. The piston 196 is connected to the brake band 72 and is spring urged to a retracting position as indicated.

The aforementioned passage 190 communicates with the working chamber on the release side of the piston 196. The working chamber on the apply side of piston 196 communicates with a passage 198 which extends to the manual valve and which communicates with control pressure passage 186 through the manual valve. It is thus apparent that when both of the opposed working chambers of the brake servo defined by cylinder 194 and piston 196 are pressurized, the brake band 192 will be released. However, when the working chamber on the release side of the piston 196 is exhausted, the brake band 72 will be applied.

The brake band 102 is also energized by means of a fluid pressure operated servo which is defined by a cylinder 200 and a cooperating piston 202. The piston 202 is mechanically connected to the brake band and is normally urged toward a released position by a brake release spring as indicated. The piston 202 and the cylinder 200 define a working chamber which communicates with a passage 204 extending to the manual valve spool. When the manual valve spool 166 is in the position shown, passage 204 communicates with the manual valve chamber between valve lands 168 and 170 which in turn is exhausted through an associated exhaust port as indicated.

The shift valve 174 includes a portion 206 situated at the upper end of valve element 176 which includes a relatively large diameter valve land 208. The upper side of land 208 is subjected to a vehicle speed sensitive governor pressure which is supplied thereto by a communicating passage 210, said passage extending to the previously described governor valve mechanism generally designated by the numeral 119.

As best seen in FIGURE 1, valve mechanism 119 comprises a valve element 212 situated in the previously described opening on one side of the axis of rotation of tailshaft 118. The opening in which valve element 212 is situated communicates with an exhaust port 214 and the valve element 212 is urged under the influence of centrifugal pressure to a radially outward position, thereby tending to close exhaust port 214. The opening for valve element 212 communicates with port 214 and the passage 210 extends thereto as indicated in FIGURE 2.

The passage 210 also communicates with passage 144 through a flow restricting orifice 216. The pressure in passage 210 exerts a radially inward force on valve element 212 which opposes and balances the centrifugal force acting in the opposite direction. It is apparent that communication between passage 210 and exhaust port 214 will be determined by the speed of rotation of the tailshaft, and the pressure in the passage 210 will be a function of the tailshaft speed. The orifice 216 establishes the desired amount of back pressure in passage 144 so that pump mechanism 114 may be utilized as a source of control pressure as previously described. This is important during reverse drive operation.

The governor pressure force acting on shift valve 174 is opposed by a modulated throttle pressure force which acts in an upward direction on valve land 180 and on a differential area formed on the lower side of land 208. Pressure is distributed to the region of the valve land 180 and land 208 through modulated throttle pressure passage 218.

A throttle pressure modulator valve element is shown at 220 and it is urged in a downward direction, as seen in FIGURE 2, by a valve spring which acts against the valve element 176. Throttle pressure is distributed to one side of the modulator valve 220 through a modulated throttle pressure passage 222 and when the shift valve 176 assumes an upward position, the modulator valve 220 is used to establish communication between passages 222 and 218 thereby creating a reduced or modulated throttle pressure in passage 218. It is this reduced throttle pressure which is utilized for determining the shift point.

The previously mentioned throttle pressure in passage 222 is produced by a throttle valve mechanism generally identified by numeral 224. This valve mechanism 224 comprises a valve spool 226 having spaced valve lands 228 and 230. Valve mechanism 224 further includes a downshift valve element 232 having spaced valve lands 234 and 236. A spring 235 is interposed between valve elements 232 and 236 so that when the former is adjusted, a valve actuating force will be transmitted to valve element 226. The movement of valve 232 is proportional to engine throttle movement and a mechanical connection between the engine throttle and valve element 232 may be provided for obtaining this adjustment.

Control pressure is distributed to the throttle valve mechanism by the lands 228 and 230 by means of a passage 238, and valve land 230 is adapted to control the degree of communication between passage 238 and the aforementioned throttle pressure passage 222. An annular working area is formed on one side of valve land 230 on which the pressure in passage 222 is caused to act. This creates a pressure force which opposes and balances the force supplied by valve spring 235. Movement of the engine throttle toward a wide open position will cause compression of spring 235 and this results in a high throttle pressure in throttle pressure passage 222. It is thus apparent that the magnitude of the throttle pressure in passage 222 will be proportional to engine torque demand.

For the purpose of explaining the mode of operation of that portion of the control circuit thus far described, it will be assumed that the selector valve is positioned as shown in FIGURE 2 and that the vehicle is operated from a standing start. The governor pressure in passage 210 will be zero when the vehicle is stationary, and if the engine throttle is relaxed the throttle pressure in passage 222 is also substantially zero. Since the shift valve element 176 assumes an upward position, passage 186 is exhausted through the exhaust port associated with the shift valve 174 and the clutch servo and the working chamber on the release side of the brake servo piston 196 are both exhausted, the latter communicating with passage 190 through passages 186 and 188 as previously explained. The working chamber on the apply side of the piston chamber 196 is pressurized by means of passage 198 and therefore the low speed brake band 72 is applied.

If the operator then depresses the engine throttle, engine torque will be transmitted through the converter 10 and through the gear unit 12 in the manner previously described to provide an over-all driving ratio with maximum torque multiplication. Operation in the low speed driving ratio continues until the magnitude of the governor pressure in passage 210 is sufficient to cause the shift valve element 176 to move in a downward direction against the opposing force of valve spring 182 and the modulated throttle pressure force. The valve element 176 will then shift to the position shown in FIGURE 2 and the vehicle speed at which this shift occurs will be determined by the engine throttle setting.

After the valve element 176 assumes the position shown, communication is established between passages 184 and 186 thereby causing the servo for the clutch 76 to be energized and the pressure chamber on the release side of the brake servo piston 196 to be concurrently pressurized. Since the clutch assembly 76 becomes energized in sequence with engagement of brake band 22, the transmission is conditioned for direct drive operation.

If it is desired to operate the transmission in reverse, manual valve spool 166 can be shifted to the reverse position and passage 198 becomes exhausted through an exhaust port 240 which becomes uncovered by valve land 72. Control pressure passage 136 is brought into direct communication with passage 204 and the working chamber defined in part by numeral 202 of the reverse piston circuit is therefore pressurized to apply the reverse brake band 102. The clutch assembly 76 is de-energized since the passage 186 is exhausted through the exhaust port associated with shift valve 174, the valve element 176 assuming an upward position during reverse drive operation under the influence of the spring and modulated throttle pressure forces. Since the clutch assembly 76 and the brake band 72 are released while the brake band 102 is applied, the transmission is in condition for reverse drive operation as previously explained in the description of the transmission structure shown in FIGURE 1.

When the shift valve moves to the direct drive position as indicated in FIGURE 2 during a shift from low speed operation to normal drive operation, the valve element 176 causes the modulator valve element 220 to move in a downward direction and to block passage 218 while opening passage 242. Passage 242 extends to the throttle valve mechanism and it communicates therethrough with a passage 244 extending to an exhaust port 246 in the manual valve 164. It is thus apparent that the upwardly directed modulated throttle pressure forces which act on the shift valve element 176 prior to the shift to the direct drive position are terminated, and the shift valve 174 will therefore maintain a direct drive position until the governor pressure becomes sufficiently reduced in magnitude to permit the valve 176 to move in an upward direction under the influence of spring pressure and the throttle pressure force on valve element 220. The vehicle speed at which this shift to the upward or low speed position occurs will be substantially less than the vehicle speed at which a shift will occur from a low speed upward position to the direct drive downward position.

It is desirable to delay the application of the low speed brake band 72 during a downshift from direct drive to the low speed ratio under a zero throttle condition. This prevents an undesirable roughness when the brake band 72 is applied. This delay is accomplished by the previously mentioned orifice control valve 192 which comprises a valve spool 248 having spaced valve lands 250 and 252. Valve spool 248 is urged in a downward direction by a suitable valve spring. The valve spool 248 is slidably positioned in the valve chamber and the lower end thereof is subjected to throttle pressure by means of a passage 254. Whenever the engine is under torque, the throttle pressure is sufficient to maintain spool 248 in the position shown and then free communication is established through orifice control valve 192 between passages 188 and 190. However, under zero throttle conditions the throttle pressure becomes reduced to zero and the valve spool 248 is moved in a downward direction under the influence of the associated valve spring. When this occurs, passage 188 communicates with passage 190 only through a bypass orifice shown at 256. Whenever a downshift occurs under zero throttle conditions the pressurized fluid in the pressure chamber on the release side of the brake servo piston 196 must be exhausted through the orifice 256 and this delays the application of the brake band 72 relative to the time interval required to de-energize the clutch assembly 76.

It is not desirable to restrict the degree of communication between passages 188 and 190 during a light throttle upshift since this would cause an undesirable overlap between the engagement of the clutch assembly 76 and the disengagement of the brake band 72. During such a light throttle upshift the valve spool 248 would normally assume a downward position and would normally provide such a restriction. I have therefore provided a passage 258 which bypasses the orifice control valve 192 and which permits pressurized fluid to pass directly from passage 186 to passage 190 and into the working chamber on the release side of the brake servo piston 196. I have therefore provided a one-way check valve as shown at 260 to accommodate this direct transfer of pressurized fluid to the brake servo. During the above-described zero throttle downshift the check valve 260 is effective to inhibit a bypass flow through passage 258 and the orifice 256 provides the only exhaust path for the fluid chamber on the release side of the brake servo piston 196.

It is undesirable to allow the orifice control valve 192 to restrict the fluid exhaust path for the low speed brake servo when the vehicle is traveling at relatively high speeds and when the manual valve is shifted to a low range position indicated by the symbol "L." I have therefore provided a piston element 262 in the lowermost portion of the valve chamber for the orifice control valve 192. The lower end of the piston element 262 is subjected to control pressure when the manual valve assumes the low range position and this control pressure is distributed to the orifice control valve through passage 264. It is thus apparent that whenever the manual valve is shifted to the low range position, the orifice control valve element 248 will be held in the upward position regardless of the engine throttle position or the magnitude of the engine throttle pressure. The brake band 72 may therefore be quickly applied as the clutch assembly 76 is disengaged. This prevents an undesirable slippage of the friction elements.

As previously indicated, the transmission may be conditioned for continuous operation in the low speed drive range by moving the manual valve to the low range position and this causes valve land 172 to uncover passage 264 so that the latter will communicate directly with control pressure passage 136 through the manual valve. Passage 264 also communicates with the lower end of a portion 206 of shift valve 174, thereby urging the same in an upward or low speed position. Control pressure is also distributed from passage 264 to passage 244 and through the throttle valve mechanism to passage 242. This causes control pressure to be distributed to the lower end of valve land 180 and to the working area on the lower side of land 208. This causes an additional pressure force which urges the shift valve 174 to a low speed position. Passage 186 is therefore brought into direct communication with the exhaust port associated with shift valve 174 and the clutch assembly 76 is exhausted directly into passage 186. Similarly, the working chamber on the release side of the brake piston 196 is exhausted through passages 190, 188 and 186, the orifice control valve 192 assuming an upward position under these conditions as previously explained.

In order to maintain a smooth shift pattern and to maintain the required torque capacity for the various clutch and brake servos, it is desirable to vary the magnitude of the control pressure in accord with the operating torque demands. For this reason a compensator valve mechanism has been included in the circuit, as indicated at 266. This mechanism comprises a multiple land valve element 268 which is positioned in a cooperating valve opening and which is formed with a plurality of opposed valve lands shown at 270, 272, 274 and 276. The valve element 268 is urged in a right-hand direction by compensator valve spring 278 which in turn is seated on a closure member 280. The region occupied by the spring 278 is subjected to governor pressure by means of passage 210 which communicates therewith. Control pressure is distributed to the compensator valve chamber at a point intermediate valve lands 270 and 272, the valve land 272 supplying controlled communication between passage 278 and a compensator pressure passage 282. Throttle pressure is conducted to the right side of valve element 268 through a passage 284 and it acts on an annular differential area between valve lands 274 and 276. Throttle pressure is also conducted to the left side of the compensator valve assembly and it acts upon the end of a valve piston element 286. A force transfer member 288 is movably mounted in closure member 280 and is adapted to engage valve piston element 286. The force transfer member 288 is urged in a left-hand direction by an inner valve spring 290 which is seated at one end thereof on a spring seat element that contacts the member 288. The other end of spring 290 acts on valve element 268.

It is thus seen that the governor pressure force and the force of spring 278 acting in a right-hand direction on the compensator valve element 268 will be balanced and opposed by the throttle pressure force acting in a left-hand direction on valve land 274. This leftward throttle pressure force is supplemented by the force of the compensator pressure in passage 282 which acts on the right side of land 272. The compensator valve element 268 therefore acts as a pressure regulator and the compensator pressure which is produced in passage 282 will be a function of both governor pressure and throttle pressure. The compensator pressure is transferred to the lower end of valve land 132 on the regulator valve spool 124 and urges the same in an upward direction. After throttle pressure is increased in response to an increased engine torque demand for any given vehicle speed, the compensator valve element 268 will be urged in a leftward direction to decrease the degree of communication between passages 238 and 282. This results in a decreased compensator pressure and the valve land 126 on the regulator valve spool 124 will therefore provide an increased degree of communication between passages 120 and 134. This results in an increased control pressure which is sufficient to increase the torque transmitting capacity of the clutch and brake servos to accommodate the increased torque which normally accompanies an increased engine throttle setting. On the other hand, after the vehicle speed increases for any given engine throttle setting, the net force acting on the valve element 268 in a right-hand direction is increased thereby increasing the degree of communication between passages 238 and 232. This increases the compensator pressure and this in turn increases the degree of communication between passages 121 and 134. This results in a decreased control pressure which is made available to the transmission clutch and brake servos and this decrease may be made to correspond to the inverse relationship between vehicle speed and engine torque.

The engine torque for any given vehicle speed is generally proportional to engine throttle setting during movement of the engine throttle from a zero throttle position to a throttle setting which is approximately 60 percent of the wide open throttle position. After this intermediate throttle setting is obtained, it is not desirable to allow the compensator pressure to become decreased since further throttle movement beyond this setting will not ordinarily correspond to an increased engine torque. A throttle pressure cut-out feature is therefore provided in the compensator valve mechanism. This cut-out feature is obtained by means of the above-described valve piston element 286 and its associated spring 290. That is, when the engine throttle reaches an intermediate setting or approximately a wide open position, the throttle pressure will be of a sufficient magnitude to cause the valve piston element 286 to compress spring 290 and to cause the force transfer member 288 to engage compensator valve element 268. Upon a further increase in engine throttle setting, the increase in the throttle pressure force resulting from the corresponding increased throttle pressure will be transferred directly to the compensator valve spool and will oppose and balance the increased throttle pressure force acting in the left-hand direction on multiple land valve spool element 268. The compensator valve mechanism will therefore be rendered insensitive to changes in engine throttle setting beyond the limiting intermediate position.

A governor pressure cut-out feature is also incorporated in the compensator valve mechanism and this is provided by a valve piston element 292 situated on the right-hand side of compensator valve element 268. The element 292 is movably positioned in a cooperating valve chamber and is adapted to engage the end of the valve element 268. Governor pressure is caused to act on the right side of element 292 and the left side of element 292 is subjected to control pressure by means of passage 238 which communicates with the associated valve chamber at this point.

It is desirable to allow the control pressure to decrease as the vehicle speed increases beyond a predetermined value for any given engine throttle setting since the torque capacity of the clutch and brake servos would be insufficient to accommodate the necessary driving torque. The element 292 is therefore calibrated so that when a predetermined limiting vehicle speed is reached for any given throttle setting, the element 292 will be biased against the opposing forces into engagement with valve element 268. Further increases in vehicle speed will cause an increased governor pressure but the resulting increased governor pressure force acting on the left side of the valve element 268 will be opposed and balanced by an equal force acting on the element 292. The compensator valve mechanism is therefore rendered insensitive to changes in the vehicle speed after a predetermined speed is obtained for any given throttle setting.

It is necessary to increase the control pressure in the circuit during operation of the transmission in reverse since the torque requirements of the reverse brake servo are relatively high. For this reason control pressure is transferred to the right side of valve land 276 of the compensator valve element 268 by means of passage 294. The passage 294 communicates with passage 204 so that it is pressurized whenever the transmission is conditioned for reverse drive operation. The pressure force acting on valve land 276 will supplement the valve forces acting in a left-hand direction on multiple land valve element 268 and will cause a decrease in the compensator pressure passage 282. This in turn will result in an increase in control pressure as previously explained.

In order to summarize the operation of the structure which is emphasized in the appended claims, let it be assumed that the vehicle is operated from a standing start and that the vehicle operator adjusts the engine throttle to an advanced setting in order to condition the power train for power delivery. The throttle valve, which is mechanically connected to the engine throttle, is therefore effective to establish a throttle pressure in throttle pressure passage 222 and in communicating passage 254. This throttle pressure urges valve spool 248 of the orifice control valve in an upward direction against the opposing valve spring force, thereby providing free communication between passages 188 and 190. The 1–2 shift valve will initially assume an upward position as viewed in FIGURE 2 and it will subsequently assume a downward or upshift position when the vehicle speed increases sufficiently to establish a governor pressure of sufficient magnitude to overcome the opposing influence of the modulated throttle pressure and spring forces acting on the 1–2 shift valve. The function of the 1–2 shift valve and its relationship to the other elements of the circuit has been particularly described.

If, after the transmission is conditioned for direct drive or high speed operation, the vehicle operator suddenly depresses the vehicle accelerator, the 1–2 shift valve will assume a downshift position thereby causing the passage 188 to communicate with the shift valve exhaust port and block communication between passages 184 and 186. The direct drive clutch 76 and the release side of the low speed servo are then simultaneously exhausted through the orifice control valve which continues to establish free communication between passages 188 and 190.

If it is now assumed that the vehicle operator, after steady state operation in the direct drive or high speed range, relaxes the engine throttle, the vehicle will coast and the throttle pressure acting on the lower end of the orifice control valve spool will become zero or substantially zero. The orifice control valve spring will then urge the orifice control valve spool in a downward direction as viewed in FIGURE 2, thereby introducing the orifice 256 into the circuit, said orifice providing the sole means by which passages 188 and 190 communicate with each other. When the vehicle continues to coast under such zero engine throttle conditions, the 1–2 shift valve will downshift when the governor pressure is reduced below a calibrated value. The direct drive clutch servo and the release side of the low speed servo are again simultaneously exhausted through the exhaust port in the 1–2 shift valve, but the fluid in the release side of the low speed servo must pass through orifice 256 and this results in a reduced rate of engagement of the low speed servo. This action provides a cushioning of the 2–1 downshift under zero throttle conditions.

The operation of the orifice control valve as above described may be overruled by means of the valve piston 262 when the manual valve is moved to the low speed range. It will be apparent that passage 264 is pressured with line pressure when the manual valve is so positioned and this line pressure acts on the lower end of valve piston 262 as viewed in FIGURE 2 thereby urging the orifice control valve spool in an upward direction against the opposing valve spring force. The orifice control valve is therefore rendered inoperative during such a manual downshift.

As previously pointed out in the specification, it is desirable to eliminate the influence of orifice 256 during a zero throttle or light throttle upshift. This is accomplished by providing a bypass passage 258 and a one-way check valve 260 therein. Valve 260 inhibits the passage of fluid from the release side of the low speed servo during a zero throttle downshift, but it will accommodate free passage of fluid in a reverse direction from passage 186 to passages 258 and 190 during a zero throttle upshift. The orifice control valve therefore has no influence on the rate of disengagement of the low speed servo under these conditions.

Having thus described a preferred form of my invention, what I claim and desire to secure by United States Letters Patent is:

1. In a control system for an automatic power transmission mechanism capable of delivering torque from an engine to a driven member, first and second fluid pressure operated servos, said first servo comprising a pair of opposed fluid pressure chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, said conduit structure including separate portions extending to each of said pressure chambers and to said second servo, means for selectively and conjointly exhausting said second servo and the other of said pressure chambers including an exhaust path defined in part by the separate portion of said conduit structure extending to said other pressure chamber and to said second servo, a precalibrated flow restricting orifice disposed in and partly defining the exhaust path of said other chamber, orifice control valve means for alternately directing the fluid exhausted from said other chamber through said orifice and for establishing an exhaust fluid flow path around said orifice, said orifice control valve means being sensitive to engine torque demand and adapted to assume a flow restricting condition when the torque demand is reduced, a bypass passage extending around said orifice control valve means and check valve means in said bypass passage for accommodating the distribution of fluid pressure to said other chamber and for inhibiting the flow of fluid from said other chamber through said bypass passage.

2. In a control system for an automatic power transmission mechanism capable of delivering torque from an engine to a driven member, first and second fluid pressure operated servos, said first servo comprising a pair of opposed servo fluid pressure chambers and a movable member disposed between and partly defining said chambers, said first servo assuming a released condition when both chambers are pressurized and assuming an applied condition when only one of said chambers is pressurized, valve means responsive to engine torque demand for restricting the flow of fluid from the other of said chambers when the torque demand is reduced and for accommodating a relatively unrestricted flow of fluid from said other chamber under increased torque demand, and valve controlled bypass passage means for accommodating a unidirectional transfer of fluid around said valve means to said other chamber.

3. In a control system for an automatic power transmission mechanism capable of delivering torque from an engine to a driven member, first and second fluid pressure operated servos, said first servo comprising a pair of opposed fluid pressure chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, a portion of said conduit structure establishing free fluid communication between said second servo and the other of said chambers, valve means responsive to engine torque demand for restricting the flow of fluid from said other chamber under reduced torque demand and for accommodating relatively unrestricted flow of fluid from said other chamber under increased torque demand, and valve controlled bypass passage means for accommodating a unidirectional transfer of fluid around said valve means to said other chamber.

4. In a control system for an automatic power transmission mechanism for delivering torque from an engine to a driven member, a gear unit defining a pair of torque delivery paths, one path providing a relatively high torque multiplication ratio and the other a relatively reduced torque multiplication ratio, clutch means for coupling together elements of said gear unit to condition the same for operation in said relatively reduced ratio, brake means for anchoring one of the elements of said gear unit to condition the same for operation in said relatively increased ratio, first and second fluid pressure operated servos adapted to actuate said brake means and said clutch means respectively, said first servo comprising a pair of opposed servo chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, shift valve means situated in and partly defining said conduit structure for selectively distributing fluid pressure to said second servo and said other chamber of said first servo and for exhausting the same to effect a shift from one torque multiplication ratio to another, valve means responsive to engine torque demand for restricting the flow of fluid from said other chamber under reduced torque demand and for accommodating a relatively unrestricted free flow of fluid from said other chamber under increased torque demand, and valve controlled bypass passage means for accommodating a unidirectional transfer of fluid around said torque demand responsive valve means to said other chamber.

5. In a control system for an automatic power transmission mechanism for delivering torque from an engine to a driven member, a gear unit defining a pair of torque delivery paths, one path providing a relatively high torque multiplication ratio and the other a relatively reduced torque multiplication ratio, clutch means for coupling together elements of said gear unit to condition the same for operation in said relatively reduced ratio, brake means for anchoring one of the elements of said gear unit to condition the same for operation in said relatively increased ratio, first and second fluid pressure operated servos adapted to actuate said brake means and said clutch means respectively, said first servo comprising a pair of opposed servo chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, shift valve mean situated in and partly defining said conduit structure for selectively distributing fluid pressure to said second servo and said other chamber of said first servo and for exhausting the same to effect a shift from one torque multiplication ratio to another, valve means responsive to engine torque demand for restricting the flow of fluid from said other chamber under reduced torque demand and for accommodating a relatively unrestricted free flow of fluid from said other chamber under increased torque demand, valve controlled bypass passage means for accommodating a unidirectional transfer of fluid around said valve means to said other chamber and a manually actuated valve means having portions situated in and partly defining said conduit structure for selectively distributing fluid pressure to said shift valve means to actuate the same and to condition the transmission mechanism for continued operation in said relatively high torque multiplication ratio, a passage interconnecting said shift valve means and said manually actuated valve means, said torque demand responsive valve means including a valve chamber and a first movable fluid pressure operated valve element disposed in said chamber and adapted to alternately assume a first fluid flow restricting position and a second free fluid flow position, and a second movable fluid pressure operated element in said valve chamber, said last-named passage means communicating with one side of said second element whereby a fluid pressure force is transmitted to said first element to bias the same to said second position when said transmission mechanism is conditioned for continued operation in said relatively high torque multiplication ratio.

6. The combination as set forth in claim 5 wherein said torque demand responsive valve means further includes a spring element acting on said first fluid pressure operated element and adapted to normally bias the same to said first position.

7. In a control system for an automatic power transmission mechanism for delivering torque from a throttle controlled engine to a driven member, a gear unit defining a pair of torque delivery paths, one path providing a relatively high torque multiplication ratio and the other a relatively reduced torque multiplication ratio, clutch means for coupling together elements of said gear unit for conditioning the same for operation in said relatively reduced ratio, brake means for anchoring one of the elements of said gear unit for conditioning the same for operation in said relatively increased ratio, first and second fluid pressure operated servos adapted to actuate said brake means and said clutch means respectively, said first servo comprising a pair of opposed servo chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, shift valve means situated in and partly defining said conduit structure for selectively distributing fluid pressure to said second servo and said other chamber of said first servo and for exhausting the same to effect a shift from one torque multiplication ratio to another, valve means responsive to engine torque demand for restricting the flow of fluid from said other chamber under reduced torque demand and for accommodating a relatively unrestricted free flow of fluid from said other chamber under increased torque demand, valve controlled bypass passage means for accommodating a unidirectional transfer of fluid around said valve means to said other chamber, throttle valve means having a portion disposed in said conduit structure including a movable engine throttle actuated element for establishing a modulated pressure proportional in magnitude to the engine throttle setting, said torque demand responsive valve means including a movable valve element adapted to alternately assume a first flow restricting position and a second free fluid flow position, said valve element being subjected to said modulated pressure for urging the same toward said second position, and spring means for normally biasing said valve element toward said first position.

8. In a control system for an automatic power transmission mechanism for delivering torque from an engine to a driven member, a gear unit defining a pair of torque delivery paths, one path providing a relatively high torque multiplication ratio and the other a relatively reduced torque multiplication ratio, clutch means for coupling together elements of said gear unit for conditioning the same for operation in said relatively reduced ratio, brake means for anchoring one of the elements of said gear unit for conditioning the same for operation in said relatively increased ratio, first and second fluid pressure operated servos adapted to actuate said brake means and said clutch means respectively, said first servo comprising a pair of opposed servo chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, shift valve means situated in and partly defining said conduit structure for selectively distributing fluid pressure to said second servo and said other chamber of said first servo and for exhausting the same to effect a shift from one torque multiplication ratio to another, valve means responsive to engine torque demand for restricting the flow of fluid from said other chamber under reduced torque demand and for accommodating a relatively unrestricted free flow of fluid from said other chamber under increased torque demand, valve controlled bypass passage means for accommodating a unidirectional transfer of fluid around said valve means to said other chamber, a pressure passage communicating with said shift valve means and adapted to distribute fluid pressure to a movable portion thereof for maintaining the same in a fluid pressure exhausting position, manually operated valve means communicating with said pressure source for selectively distributing fluid pressure to said pressure passage, and a movable pressure operated element disposed adjacent said torque demand responsive valve means, one side of said pressure operated element communicating with said pressure passage whereby the fluid pressure acting thereon is transmitted to said torque demand responsive valve means to maintain the same in a free fluid flow condition.

9. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, conduit structure having portions extending to each servo and including a flow restricting orifice, fluid pressure distributing control means for energizing one servo and releasing the other and for releasing said one servo and energizing said other servo in timed relationship, engine torque demand responsive valve means forming a part of said control means for alternately directing fluid flow in portions of said conduit structure through said orifice under reduced engine torque demand and for accommodating free flow of fluid around said orifice under increased engine torque demand during a shift from one ratio to another, and a valve controlled bypass passage forming a part of said conduit structure for accommodating a unidirectional transfer of fluid around said torque demand responsive valve means during a shift from said other ratio to said one ratio.

10. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, conduit structure having portions extending to each servo and including a flow restricting orifice, fluid pressure distributing control means for energizing one servo and releasing the other and for releasing said one servo and energizing said other servo in timed relationship, engine torque demand responsive valve means forming a part of said control means for alternatively directing fluid flow in portions of said conduit structure through said orifice under reduced engine torque demand and for accommodating free flow of fluid around said orifice under increased engine torque demand during a shift from one ratio to another, a valve controlled bypass passage forming a part of said conduit structure for accommodating a unidirectional transfer fluid around said torque demand responsive valve means during a shift from said other ratio to said one ratio, and means for selectively rendering said torque demand responsive valve means inoperative and for maintaining the same in a free fluid flow condition when said mechanism is conditioned for sustained operation in said other ratio.

11. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, control means for alternately energizing and releasing said servos in timed relationship to effect a shift from one speed ratio to another, an engine torque demand responsive valve means forming a part of said control means for altering the rate at which said servos are energized and de-energized during a shift from one speed ratio to another, including fluid delivery passage structure communicating with one of said servos and a unidirectional fluid flow restricting means disposed therein for retarding the rate of transfer of fluid through said passage structure in one direction relative to the rate of transfer of fluid therethrough in the opposite direction when the engine torque demand is reduced whereby the time interval required to shift from a relatively high speed ratio to a relatively low speed ratio with a reduced engine torque demand is increased relative to the time required to accomplish a corresponding shift with an increased engine torque demand.

12. The combination as set forth in claim 11 wherein said control means further includes a fluid pressure operated element adapted to act on said engine torque demand responsive valve means to inhibit operation thereof, and means for selectively pressurizing said pressure operated element to actuate the same.

13. In a control system for an automatic power transmission mechanism capable of delivering torque from an engine to a driven member, first and second fluid pressure operated servos, said first servo comprising a pair of opposed fluid pressure chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, said conduit structure including separate portions extending to each of said pressure chambers and to said second servo, means for selectively and conjointly exhausting said second servo and the other of said pressure chambers including an exhaust path defined in part by the separate portion of said conduit structure extending to said other pressure chamber and to said second servo, a precalibrated flow restricting orifice disposed in and partly defining the exhaust path of said other chamber, orifice control valve means for alternately directing the fluid exhausted from said one chamber through said orifice and for establishing an exhaust fluid flow path around said orifice, said orifice control valve means being sensitive to engine torque demand and adapted to assume a flow restricting condition when the torque demand is reduced, and a bypass passage means for accommodating a unidirectional and relatively uninhibited distribution of fluid pressure to said other chamber.

14. In a control system for an automatic power transmission mechanism capable of delivering torque from an engine to a driven member, first and second fluid pressure operated servos, said first servo comprising a pair of opposed servo fluid pressure chambers and a movable member disposed between and partly defining said chambers, said first servo assuming a released condition when both chambers are pressurized and assuming an applied condition when only one of said chambers is pressurized, valve means responsive to engine torque demand for restricting the flow of fluid from the other of said chambers when the torque demand is reduced and for accommodating a relatively unrestricted flow of fluid from said other chamber under increased torque demand, and passage means for accommodating distribution of fluid pressure independently of said valve means to said other chamber.

15. In a control system for an automatic power transmission mechanism capable of delivering torque from an engine to a driven member, first and second fluid pressure operated servos, said first servo comprising a pair of opposed fluid pressure chambers and a movable member disposed between and partly defining said chambers, said first servo assuming a released condition when both chambers are pressurized and assuming an applied condition when only one of said chambers is pressurized, a fluid pressure source, conduit structure extending from said pressure source to said second servo and to both chambers of said first servo, a portion of said conduit structure establishing free fluid communication between said second servo and the other of said chambers, valve means responsive to engine torque demand for restricting the flow of fluid from said other chamber under reduced torque demand and for accommodating relatively unrestricted flow of fluid from said other chamber under increased torque demand, and bypass passage means for accommodating a unidirectional transfer of fluid around said valve means to said other chamber.

16. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, conduit structure having portions extending to each servo and including a flow restricting orifice, fluid pressure distributing control means for energizing one servo and releasing the other and for releasing said one servo and energizing said other servo in timed relationship, engine torque demand responsive valve means forming a part of said control means for alternately directing fluid flow in portions of said conduit structure through said orifice under reduced engine torque demand and for accommodating free flow of fluid around said orifice under increased engine torque demand during a shift from one ratio to another, and bypass passage means forming a part of said conduit structure for accommodating a transfer of fluid around said torque demand responsive means during a shift from said other ratio to said one ratio.

17. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, conduit structure having portions extending to each servo and including a flow restricting orifice, fluid pressure distributing control means for energizing one servo and releasing the other and for releasing said one servo and energizing said other servo in timed relationship, engine torque demand responsive valve means forming a part of said control means for alternately directing fluid flow in portions of said conduit structure through said orifice under reduced engine torque demand and for accommodating free flow of fluid around said orifice under increased engine torque demand during a shift from one ratio to another, bypass passage means forming a part of said conduit structure for accommodating a transfer of fluid around said torque demand responsive valve means during a shift from said other ratio to said one ratio, and means for selectively rendering said torque demand responsive valve means inoperative and for maintaining the same in a free fluid flow condition when said mechanism is conditioned for sustained operation in said other ratio.

No references cited.